US 6,647,174 B2

(12) United States Patent
Gooding et al.

(10) Patent No.: US 6,647,174 B2
(45) Date of Patent: Nov. 11, 2003

(54) OPTICAL FIBER TRANSMISSION BYPASS DEVICE

(75) Inventors: Thomas Michael Gooding, Rochester, MN (US); Jeffrey Joseph Ruedinger, Rochester, MN (US); Christopher Paul Schieffer, Rochester, MN (US); Michael Arthur Snyder, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 10/041,256

(22) Filed: Jan. 8, 2002

(65) Prior Publication Data

US 2003/0128914 A1 Jul. 10, 2003

(51) Int. Cl.$^7$ .............................. G02B 6/26; G02B 6/35
(52) U.S. Cl. .............................. 385/18; 385/16; 385/23; 385/31; 398/2; 398/3; 398/7
(58) Field of Search ............................ 385/16, 18, 22, 385/23, 24, 25, 26, 27, 31; 398/1, 2, 3, 4, 5, 6, 7

(56) References Cited

U.S. PATENT DOCUMENTS 5,542,013 A * 7/1996 Kaplow et al. ............... 385/25

* cited by examiner

*Primary Examiner*—John D. Lee
*Assistant Examiner*—Daniel Valencia
(74) *Attorney, Agent, or Firm*—Bracewell & Patterson, LLP

(57) ABSTRACT

An optical transmission bypass device attaching a network device to a fiber optic network allows fiber optic transmissions to bypass the network device when not powered, thereby maintaining continuity of the fiber network. A first and second actuating optical reflector has a reflective face that, in an un-powered state, is disposed to place the reflective face of the actuating optical reflector in a first position with respect to an optical path of an optical port, and, in a powered state, is disposed to place the reflective face of the actuating optical reflector in a second position with respect to the optical path of the optical port.

20 Claims, 2 Drawing Sheets

OPTICAL FIBER TRANSMISSION BYPASS DEVICE

BACKGROUND OF THE INVENTION

1. Technical Field

The present invention relates generally to optical networks. More particularly, the present invention relates to transmission bypass techniques in fiber optic networks.

2. Description of the Related Art

Fiber optic networks are used in a variety of applications. In some applications, such as signal routing in a device interconnection network, devices connected to the fiber optic network are interconnected in series such that the output from each device is connected to the input of another device, such that the fiber optic network forms a loop network. However, a problem arises in such networks when one of the devices connected to the network is not powered on or fails. This essentially breaks the loop or chain network and prevents the network devices on either side of the powered-down device from communicating. It would be desirable to provide a network device that allows fiber optic transmission even when not powered.

SUMMARY OF THE INVENTION

An optical transmission bypass device attaching a network device to a fiber optic network allows fiber optic transmissions to bypass the network device when not powered, thereby maintaining continuity of the fiber network. The optical transmission bypass device comprises a first and second optical port, a first and second actuating optical reflector and an optical transmission line. The first optical port is optically coupled to a first optical transmission line, and the second optical port is optically coupled to a second optical transmission line. The first actuating optical reflector has a reflective face that, in a first state, is disposed to place the reflective face of the first actuating optical reflector in a first position with respect to an optical path of the first optical port, and, in a second state, is disposed to place the reflective face of the first actuating optical reflector in a second position with respect to the optical path of the first optical port, wherein the first actuating optical reflector is in the first state when the first actuating optical reflector is not electrically powered. The second actuating optical reflector has a reflective face that, in the first state, is disposed to place the reflective face of the second actuating optical reflector in a first position with respect to an optical path of the second optical port, and, in the second state, is disposed to place the reflective face of the second actuating optical reflector in a second position with respect to the optical path of the second optical port, wherein the second actuating reflector is in the first state when the second actuating optical reflector is not electrically powered. The optical transmission line is positioned between the first actuating reflector and the second actuating reflector, wherein, in the first state: the optical transmission line is optically coupled at a first end to the first optical port by the reflective face of the first actuating optical reflector and optically coupled at a second end to the second optical port by the reflective face of the second actuating optical reflector, such that received optical transmission data at the first optical port is reflected from the first reflective face of the first actuating optical reflector into the first end of the optical transmission line and out of the second end of the optical transmission line and reflected from the second reflective face of the second actuating optical reflector to the second optical port to provide the received optical transmission data for transmission by the second optical transmission line. In the second state, the optical transmission line is not optically coupled at a first end to the first optical port by the reflective face of the first actuating optical reflector and not optically coupled at a second end to the second optical port by the reflective face of the second actuating optical reflector.

In an alternative embodiment, in the second state, the reflective face of the first actuating optical reflector in the second position with respect to the optical path of the received optical transmission data is positioned such that the reflective face of the first actuating optical reflector is outside the optical path of the received optical transmission data, allowing the received optical transmission data at the first optical port to pass directly to a receiver, and the reflective face of the second actuating optical reflector in the second position with respect to the optical path of the optical transmission data provided by the second optical port to the second optical transmission line is positioned such that the reflective face of the second actuating optical reflector is outside the optical path of the optical transmission data provided by the second optical port, allowing optical transmission data from a transmitter to pass directly to the second optical port.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

This invention is described in a preferred embodiment in the following description with reference to the figures, in which like numbers represent the same or similar elements.

DETAILED DESCRIPTION OF THE PREFERRED EMBODIMENT

Figure 1:
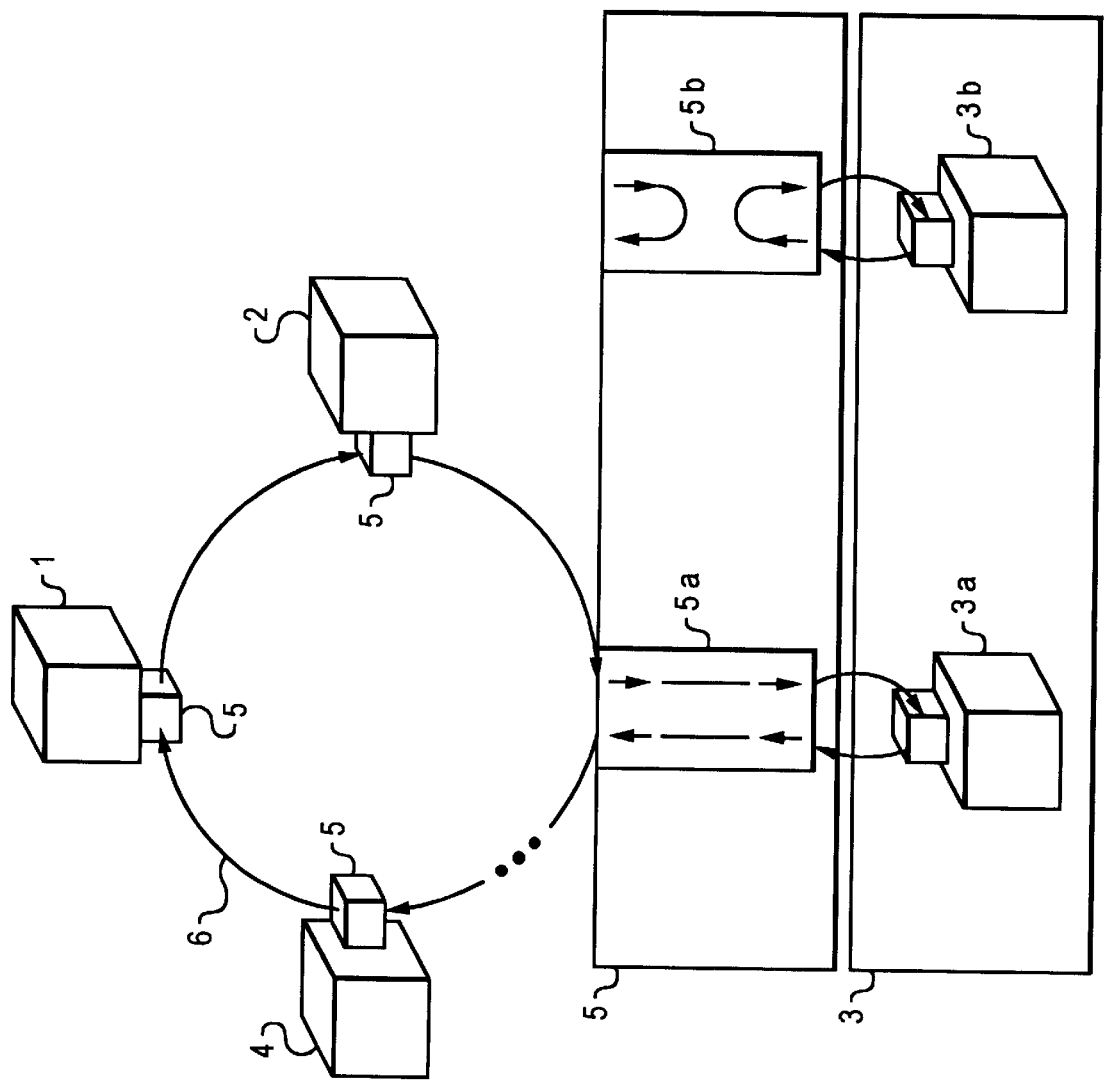
FIG. 1 depicts a data processing system network in which a preferred embodiment of the present invention may be implemented.

FIG. 1 is an illustration of a ring network 6, which comprises a multiplicity of nodes 1, 2, 3 and 4, connected in serial fashion. The node numbered "4" represents the "nth" node, so that there can be any number of nodes attached to the ring. A connector 5 serves as the interface between the ring and node. The connector 5 can route optical information in either of two ways. This is illustrated in FIG. 1 by showing one connection as block 5*a* and the other as block 5*b*, with blocks 5*a* and 5*b* connected to node blocks 3*a* and 3*b*, respectively. It should be understood that a single node 3 and single connector 5 are in fact employed. The normal optical information flow from the ring 6, across the connector 5, to the node 3, across the connector 5 and back to the ring, known as the cross-state of the connector, is illustrated by connector block 5*a*. If a node fails, loses power or is disconnected, the ring will fail unless continuity of the ring is maintained. As illustrated by connector block 5*b*, upon failure or disconnection of node 3, the node is bypassed by optical loopback, which is referred to as the bypass-state. Optical loopback is achieved by incorporating an optical bypass device, in accordance with a preferred embodiment of the present invention discussed below, into various fiber optic connectors.

Figure 2:
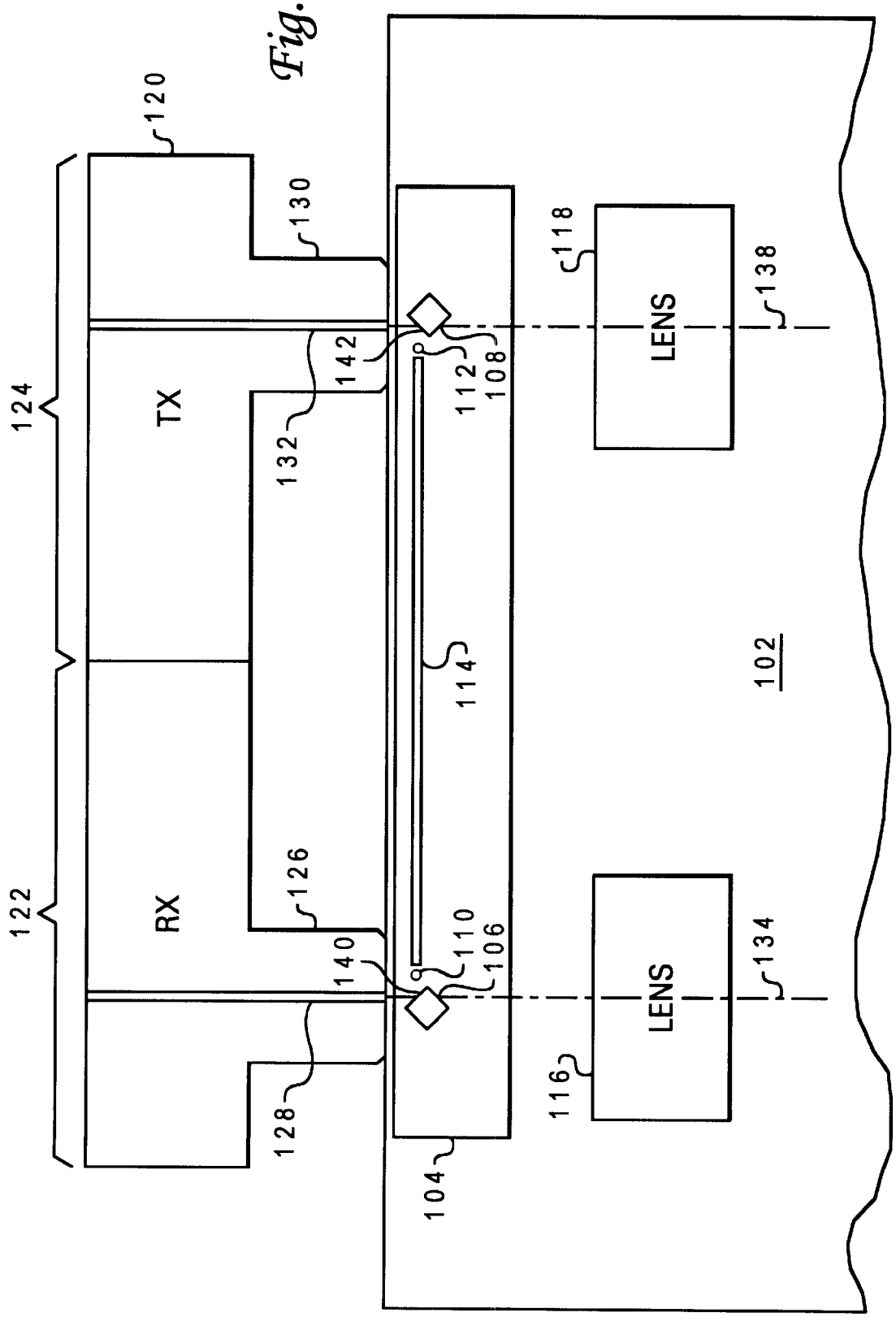
FIG. 2 is an optical bypass device in accordance with a preferred embodiment of the present invention.

FIG. 2 shows an exemplary embodiment of an optical bypass device 102. Optical bypass device 102 includes a silicon block 104 and lenses 116, 118. Silicon block 104 has built therein micro-electrical-mechanical systems (MEMS) mirrors 106, 108, ball lenses 110, 112 and fiber stub 114. MEMS mirrors 106,108 are micro-actuated devices mounted with precision micro-mirrors.

The optical bypass device 102 operates in two states that are defined by the position of MEMS mirrors 106, 108. As described in more detail below, optical signals entering the optical bypass device 102 from fiber optic cable 120 are directed to follow different paths in those two states. A controlled voltage or current source, not shown, can be used to control the action of the MEMS mirrors 106, 108 in enabling one or the other of the two states.

Fiber optic cable 120 is a duplex cable having a receive (RX) portion 122 and a transmit (TX) portion 124. For example, optical fibers 128, 132 may be glass 62.5/125 multi-mode fibers. Receive portion 122 contains a ferrule 126 housing an optical fiber 128. Transmit portion 124 contains ferrule 130 housing optical fiber 132. Fiber optic cable 120 is fixedly attached to optical bypass device 102. A ferrule is a mechanical fixture, generally a rigid tube, used to confine the stripped end of a fiber bundle or a fiber. Receive portion 122 is mounted on optical bypass device 102 such that optical fiber 128 is aligned with optical axis 134, and such that transmit portion 124 is mounted on optical bypass device 102 to align optical fiber 132 with optical axis 138.

MEMS mirrors 106,108 are designed to be deployed as shown in FIG. 2 in the power-offstate. The power-off state (unpowered) occurs when optical bypass device 102 is not receiving power at the MEMS mirrors 106, 108. Thus, when power is not applied to MEMS mirrors 106, 108 they reset to an initialization position. In a preferred embodiment, they have their mirror surfaces 140, 142, respectively, aligned at a 45 degree (45°) angle to optical axis 134, 138, respectively. When optical bypass device 102 receives optical transmissions over optical fiber 132, the optical transmissions are reflected at a 45° angle from mirror face 142 and enter ball lens 112. Ball lens 112 focuses the optical transmission into a first end of fiber stub 114. Fiber stub 114 transmits the optical transmission through its length and out a second end to be received by ball lens 110. Ball lens 110 focuses the optical transmission onto mirror face 140 of MEMS mirror 106. MEMS mirror 106, being angled at a 45° angle to optical axis 134, reflects the optical transmission directly into optical fiber 128.

When power is applied to optical bypass device 102, MEMS mirrors 106,108 are deployed in the power-on state (powered), whereby MEMS mirrors 106, 108 rotate to place mirror faces 140, 142 parallel to optical axis 134, 138, respectively, and in such a manner as to place MEMS mirrors 106, 108 outside of the optical path of optical transmissions over optical fibers, 128,132 and along optical axes 134, 138, respectively. Therefore, when optical bypass device 102 is powered and MEMS mirrors 106, 108 are deployed in the power-on state, optical transmissions are transmitted through optical fiber 128 along optical axis 134, through lens 116, and into additional optical processing components (not shown) within optical bypass 102 or the network device attached to optical bypass device 102. Optical transmissions transmitted by optical bypass device 102 or an attached network device are transmitted along optical axis 138, through lens 118, to be focused at the entrance of optical fiber 132, and thereby transmitted through the transmit portion 124 of optical fiber 120.

As implemented in a preferred embodiment, fiber cable 120 would be part of a fiber optic network transmitting and receiving optical transmission data from a transceiver system incorporating optical bypass device 102. In the system shown in FIG. 1, ring network 6 would include fiber cable 120 and connector 5 would comprise optical bypass device 102. When the system incorporating optical bypass device 102 is operating correctly and is properly powered, optical bypass device 102 operates in the cross-state of the connector, thereby allowing optical transmission to and from the system through lenses 116, 118. This is accomplished by actuating MEMS mirrors 106,108 in the power-on state into position outside of the optical path of optical fibers 128, 132 along optical axes 134, 138.

Upon failure or disconnection of node 3 (for example, by the network device being turned off or un-plugged from the optical bypass device), optical bypass device 102 maintains ring continuity with ring network 6 by providing the optical loop back of the bypass-state. The bypass-state is characterized by MEMS mirrors 106, 108 being deployed in the power-off state such that they are aligned at a 45° angle to optical axes 134, 138. This creates the optical loop back along the optical path formed by optical fiber 128 to MEMS mirror 106, to ball lens 110, to fiber stub 114, to ball lens 112, to MEMS mirror 108 and finally to optical fiber 132.

While the invention has been particularly shown and described with reference to a preferred embodiment, it will be understood by those skilled in the art that various changes in form and detail may be made therein without departing from the spirit and scope of the invention.

What is claimed is:

1. An optical transmission bypass device, comprising:

a first optical port optically coupled to a first optical transmission line, wherein the first optical port receives optical transmission data provided by the first optical transmission line;

a first actuating optical reflector with a reflective face that, in a first state, is disposed to place the reflective face of the first actuating optical reflector in a first position with respect to an optical path of the received optical transmission data, and, in a second state, is disposed to place the reflective face of the first actuating optical reflector in a second position with respect to the optical path of the received optical transmission data, wherein the first actuating optical reflector is in the first state when the first actuating optical reflector is not electrically powered;

a second optical port optically coupled to a second optical transmission line, wherein the second optical port provides optical transmission data for transmission by the second optical transmission line;

a second actuating optical reflector with a reflective face that, in the first state, is disposed to place the reflective face of the second actuating optical reflector in a first position with respect to an optical path of the optical transmission data provided by the second optical port to the second optical transmission line, and, in the second state, is disposed to place the reflective face of the second actuating optical reflector in a second position with respect to the optical path of the optical transmission data provided by the second optical port to the second optical transmission line, wherein the second actuating reflector is in the first state when the second actuating optical reflector is not electrically powered; and a third optical transmission line positioned between the first actuating reflector and the second actuating reflector; wherein, in the first state: the third optical transmission line is optically coupled at a first end to the first optical port by the reflective face of the first actuating optical reflector and optically coupled at a second end to the second optical port by the reflective face of the second actuating optical reflector, such that received optical transmission data at the first optical port is reflected from the first reflective face of the first actuating optical reflector into the first end of the third optical transmission line and out of the second end of the third optical transmission line and reflected from the second reflective face of the second actuating optical reflector to the second optical port to provide the received optical transmission data for transmission by the second optical transmission line.

2. An optical transmission bypass device, according to claim 1, wherein, in the second state:
the third optical transmission line is not optically coupled at a first end to the first optical port by the reflective face of the first actuating optical reflector and not optically coupled at a second end to the second optical port by the reflective face of the second actuating optical reflector.

3. An optical transmission bypass device, according to claim 1, wherein, in the second state:
the reflective face of the first actuating optical reflector in the second position with respect to the optical path of the received optical transmission data is positioned such that the reflective face of the first actuating optical reflector reflects the received optical transmission data directly to a receiver, and the reflective face of the second actuating optical reflector in the second position with respect to the optical path of the optical transmission data provided by the second optical port to the second optical transmission line is positioned such that the reflective face of the second actuating optical reflector reflects optical transmission data from a transmitter directly to the second optical port.

4. An optical transmission bypass device, according to claim 1, wherein, in the second state:
the reflective face of the first actuating optical reflector in the second position with respect to the optical path of the received optical transmission data is positioned such that the reflective face of the first actuating optical reflector is outside the optical path of the received optical transmission data, allowing the received optical transmission data at the first optical port to pass directly to a receiver, and the reflective face of the second actuating optical reflector in the second position with respect to the optical path of the optical transmission data provided by the second optical port to the second optical transmission line is positioned such that the reflective face of the second actuating optical reflector is outside the optical path of the optical transmission data provided by the second optical port, allowing optical transmission data from a transmitter to pass directly to the second optical port.

5. An optical transmission bypass device, according to claim 1, wherein the third optical transmission line is an optical fiber.

6. An optical transmission bypass device, according to claim 1, wherein the first actuating optical reflector is a MEMS device.

7. An optical transmission bypass device, according to claim 1, wherein the reflective face of the first actuating optical reflector is a mirror.

8. An optical transmission bypass device, according to claim 1, wherein the first actuating optical reflector and the second actuating optical reflector are set in the first state in response to an indication that a device connected to the optical transmission bypass device is not operating correctly.

9. An optical transmission bypass device, according to claim 1, wherein the first actuating optical reflector and the second actuating optical reflector are set in the first state in response to an indication that an electrically powered device is not connected to the optical transmission bypass device.

10. An optical transmission bypass device, according to claim 1, wherein a first lens is disposed between the reflective face of the first actuating optical reflector in the first position and the first end of the third optical transmission line, and a second lens is disposed between the reflective face of the second actuating optical reflector in the first position and the second end of the third optical transmission line.

11. A system for transmitting data, comprising:
an optical network having a plurality of devices optically coupled thereto, wherein at least one of the plurality of devices includes an optical transmission bypass device, comprising:
a first optical port optically coupled to a first optical transmission line, wherein the first optical port receives optical transmission data provided by the first optical transmission line;
a first actuating optical reflector with a reflective face that, in a first state, is disposed to place the reflective face of the first actuating optical reflector in a first position with respect to an optical path of the received optical transmission data, and, in a second state, is disposed to place the reflective face of the first actuating optical reflector in a second position with respect to the optical path of the received optical transmission data, wherein the first actuating optical reflector is in the first state when the first actuating optical reflector is not electrically powered;
a second optical port optically coupled to a second optical transmission line, wherein the second optical port provides optical transmission data for transmission by the second optical transmission line;
a second actuating optical reflector with a reflective face that, in the first state, is disposed to place the reflective face of the second actuating optical reflector in a first position with respect to an optical path of the optical transmission data provided by the second optical port to the second optical transmission line, and, in the second state, is disposed to place the reflective face of the second actuating optical reflector in a second position with respect to the optical path of the optical transmission data provided by the second optical port to the second optical transmission line, wherein the second actuating reflector is in the first state when the second actuating optical reflector is not electrically powered; and
a third optical transmission line positioned between the first actuating reflector and the second actuating reflector, wherein, in the first state: the third optical transmission line is optically coupled at a first end to the first optical port by the reflective face of the first actuating optical reflector and optically coupled at a second end to the second optical port by the reflective face of the second actuating optical reflector, such that received optical transmission data at the first optical port is reflected from the first reflective face of the first actuating optical reflector into the first end of the third optical transmission line and out of the second end of the third optical transmission line and reflected from the second reflective face of the second actuating optical reflector to the second optical port to provide the received optical transmission data for transmission by the second optical transmission line.

12. The system, according to claim 11, wherein, in the second state:

the third optical transmission line is not optically coupled at a first end to the first optical port by the reflective face of the first actuating optical reflector and not optically coupled at a second end to the second optical port by the reflective face of the second actuating optical reflector.

13. The system, according to claim 11, wherein, in the second state:

the reflective face of the first actuating optical reflector in the second position with respect to the optical path of the received optical transmission data is positioned such that the reflective face of the first actuating optical reflector reflects the received optical transmission data directly to a receiver in the at least one of the plurality of devices, and the reflective face of the second actuating optical reflector in the second position with respect to the optical path of the optical transmission data provided by the second optical port to the second optical transmission line is positioned such that the reflective face of the second actuating optical reflector reflects optical transmission data from a transmitter in the at least one of the plurality of devices directly to the second optical port.

14. The system, according to claim 11, wherein, in the second state:

the reflective face of the first actuating optical reflector in the second position with respect to the optical path of the received optical transmission data is positioned such that the reflective face of the first actuating optical reflector is outside the optical path of the received optical transmission data, allowing the received optical transmission data at the first optical port to pass directly to a receiver in the at least one of the plurality of devices, and the reflective face of the second actuating optical reflector in the second position with respect to the optical path of the optical transmission data provided by the second optical port to the second optical transmission line is positioned such that the reflective face of the second actuating optical reflector is outside the optical path of the optical transmission data provided by the second optical port, allowing optical transmission data from a transmitter in the at least one of the plurality of devices to pass directly to the second optical port.

15. The system, according to claim 11, wherein the third optical transmission line is an optical fiber.

16. The system, according to claim 11, wherein the first actuating optical reflector is a MEMS device.

17. The system, according to claim 11, wherein the reflective face of the first actuating optical reflector is a mirror.

18. The system, according to claim 11, wherein the first actuating optical reflector and the second actuating optical reflector are set in the first state in response to an indication that a device connected to the optical transmission bypass device is not operating correctly.

19. The system, according to claim 11, wherein the first actuating optical reflector and the second actuating optical reflector are set in the first state in response to an indication that an electrically powered device is not connected to the optical transmission bypass device.

20. The system, according to claim 11, wherein the optical network is a ring network.

* * * * *